United States Patent
Song et al.

(10) Patent No.: US 9,455,443 B2
(45) Date of Patent: Sep. 27, 2016

(54) LITHIUM TITANIUM OXIDE, METHOD OF PREPARING THE SAME, NEGATIVE ELECTRODE INCLUDING THE SAME, AND LITHIUM BATTERY INCLUDING THE NEGATIVE ELECTRODE

(75) Inventors: Min-sang Song, Seongnam-si (KR);
Ryoung-hee Kim, Yongin-si (KR);
Jeong-kuk Shon, Hwaseong-si (KR);
Young-min Choi, Suwon-si (KR);
Jae-man Choi, Hwaseong-si (KR);
Moon-seok Kwon, Hwaseong-si (KR);
Seung-sik Hwang, Seongnam-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 964 days.

(21) Appl. No.: 13/587,020

(22) Filed: Aug. 16, 2012

(65) Prior Publication Data
US 2013/0202968 A1    Aug. 8, 2013

(30) Foreign Application Priority Data

Feb. 8, 2012 (KR) ........................ 10-2012-0012913

(51) Int. Cl.
| | | |
|---|---|---|
| *C01G 1/00* | (2006.01) | |
| *H01M 4/485* | (2010.01) | |
| *C01G 1/02* | (2006.01) | |
| *C01G 23/00* | (2006.01) | |
| *H01M 10/0525* | (2010.01) | |

(52) U.S. Cl.
CPC ................ *H01M 4/485* (2013.01); *C01G 1/02* (2013.01); *C01G 23/005* (2013.01); *H01M 10/0525* (2013.01); *Y02E 60/122* (2013.01)

(58) Field of Classification Search
None
See application file for complete search history.

(56) References Cited

U.S. PATENT DOCUMENTS

| | | |
|---|---|---|
| 2004/0197657 A1 | 10/2004 | Spitler et al. |
| 2010/0301284 A1 | 12/2010 | Suzuki et al. |
| 2011/0189545 A1 | 8/2011 | Holzapfel et al. |

FOREIGN PATENT DOCUMENTS

| | | |
|---|---|---|
| CN | 102024949 A | 4/2011 |
| EP | 2306557 A1 | 4/2011 |
| KR | 1020110027627 A | 3/2011 |
| KR | 1020110032531 A | 3/2011 |
| KR | 1020110038392 A | 4/2011 |
| WO | 02061763 A1 | 8/2002 |
| WO | 2004008560 A2 | 1/2004 |

OTHER PUBLICATIONS

EP Search Report for 12183048.3 mailing date of Feb. 12, 2013.
Xing Li, et al, "Structural and Electrochemical Characteristics of Li4-xKxTi5O12 as Anode Material for Lithium-Ion Batteries", Chinese Journal of Inorganic Chemistry, vol. 26, No. 2, 2010, pp. 233-239.
Martin Wilkening, et al, Ultaslow Li diffusion in spinel-type structured Li4Ti5O12—A Comparison of results from solid state NMR and impedance spectroscopy, Phys. Chem. Chem Phys., Sep. 2007, pp. 1239-1246.
Xing Li, et al "Structural and Electrochemical Performances of Li4Ti5-XZRX012 as Anode Material for Lithium-Ion Batteries", Journal of Alloys and Compounds, 487, (2009), pp. L12-L17.
Vijayakumar et al., "Lithium diffusion in Li4Ti5O12 at high temperatures", Journal of Power Sources, vol. 196, 2011, pp. 2211-2220.
Chinese Office Action for Chinese Patent Application No. 201310049098.5 dated Mar. 4, 2016 with English Translation.
Li et al., "Structural and electrochemical performances of Li4Ti5-xZrxO12 as anode material for lithium-ion batteries", Journal of Alloys and Compounds, vol. 487, 2009, L12-L17.
Xing et al., "Structural and Electrochemical Characteristics of Li4-xKxTi5O12 as Anode Material for Lithium-Ion Batteries", Chinese Journal of Inorganic Chemistry, vol. 26, No. 2, 2010, pp. 233-239.

*Primary Examiner* — Steven Bos
(74) *Attorney, Agent, or Firm* — Cantor Colburn LLP

(57) ABSTRACT

A lithium titanium oxide spinel having a ratio of FWHM1/FWHM2 at a spinning rate of about 5 kHz to about 50 kHz of about 1.70 or less, wherein FWHM1 is a full width at half maximum of a $^7$Li peak present about −10 parts per million to about +10 parts per million in a solid state nuclear magnetic resonance spectrum of the lithium titanium oxide, FWHM2 is a full width at half maximum of a $^7$Li peak present about −10 parts per million to about +10 parts per million in a solid state nuclear magnetic resonance spectrum of a lithium chloride standard reagent, and FWHM1 and FWHM2 are measured at the same spinning rate.

20 Claims, 10 Drawing Sheets

LITHIUM TITANIUM OXIDE, METHOD OF PREPARING THE SAME, NEGATIVE ELECTRODE INCLUDING THE SAME, AND LITHIUM BATTERY INCLUDING THE NEGATIVE ELECTRODE

This application claims priority to and the benefit of Korean Patent Application No. 10-2012-0012913, filed on Feb. 8, 2012, and all the benefits accruing therefrom under 35 U.S.C. §119, the content of which is incorporated herein in its entirety by reference.

BACKGROUND

1. Field

The present disclosure relates to a lithium titanium oxide, methods of preparing the lithium titanium oxide, a negative electrode including the lithium titanium oxide, and a lithium battery including the negative electrode.

2. Description of the Related Art

Recently, lithium batteries are getting much attention for use as a power source of various electronic devices. Lithium batteries have a discharge voltage that is at least twice as high as that of a conventional battery using an alkali aqueous electrolyte, and have high energy density.

Lithium batteries use materials that can intercalate and deintercalate lithium ions, and include an organic electrolyte, such as a polymer electrolyte, between the positive electrode and the negative electrode. Lithium batteries produce electrical energy due to oxidation and reduction reactions which occur when lithium ions are intercalated into or deintercalated from the positive and negative electrodes.

As a negative active material for the lithium battery, graphite, a high-capacity silicon-based transition metal oxide, a tin-based transition metal oxide, or the like may be used.

However, typical negative active materials have unsatisfactory capacity, high-rate discharge characteristics, and lifespan characteristics. Thus, there is a need to provide a material having improved performance.

SUMMARY

Provided is a lithium titanium oxide, methods of preparing the lithium titanium oxides, a negative electrode including the lithium titanium oxide, and a lithium battery including the negative electrodes.

Additional aspects will be set forth in part in the description which follows and, in part, will be apparent from the description.

According to an aspect, provided is a lithium titanium oxide spinel having a ratio of FWHM1/FWHM2 of about 1.70 or less at a spinning rate of about 5 kiloHertz (kHz) to about 50 kHz, wherein FWHM1 is a full width at half maximum of a $^7$Li peak present at about −10 parts per million to about +10 parts per million in a solid state nuclear magnetic resonance (SS-NMR) spectrum of the lithium titanium oxide, FWHM2 is a full width at half maximum of a $^7$Li peak present at about −10 parts per million to about +10 parts per million in a solid state-nuclear magnetic resonance spectrum of a lithium chloride standard reagent, and FWHM1 and FWHM2 are measured at a same spinning rate.

The lithium titanium oxide may further include a first component which includes at least one selected from phosphorus and potassium and which does not bind to lithium, titanium, or oxygen.

According to an aspect, provided is a method of preparing a lithium titanium oxide spinel having a ratio of FWHM1/FWHM2 of about 1.70 or less at a spinning rate of about 5 kiloHertz to about 50 kiloHertz, wherein the method includes preparing a mixture including a lithium-containing precursor and a titanium-containing precursor; and heat treating the mixture to prepare the lithium titanium oxide, wherein the titanium-containing precursor includes a second component, which includes at least one selected from phosphorus (P) and potassium (K), wherein FWHM1 is a full width at half maximum of a $^7$Li peak present at about −10 parts per million to about +10 parts per million in a solid state-nuclear magnetic resonance spectrum of the lithium titanium oxide, FWHM2 is a full width at half maximum of a $^7$Li peak present at about −10 parts per million to about +10 parts per million in a solid state-nuclear magnetic resonance spectrum of a lithium chloride standard reagent, and FWHM1 and FWHM2 are measured at a same spinning rate.

When the lithium titanium oxide further includes the first component, the first component may be derived from the second component of the titanium-containing precursor.

According to an aspect, provided is a negative electrode including the lithium titanium oxide.

According to an aspect, provided is a lithium battery including a positive electrode including a positive active material; a negative electrode including the lithium titanium oxide; and an electrolyte.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
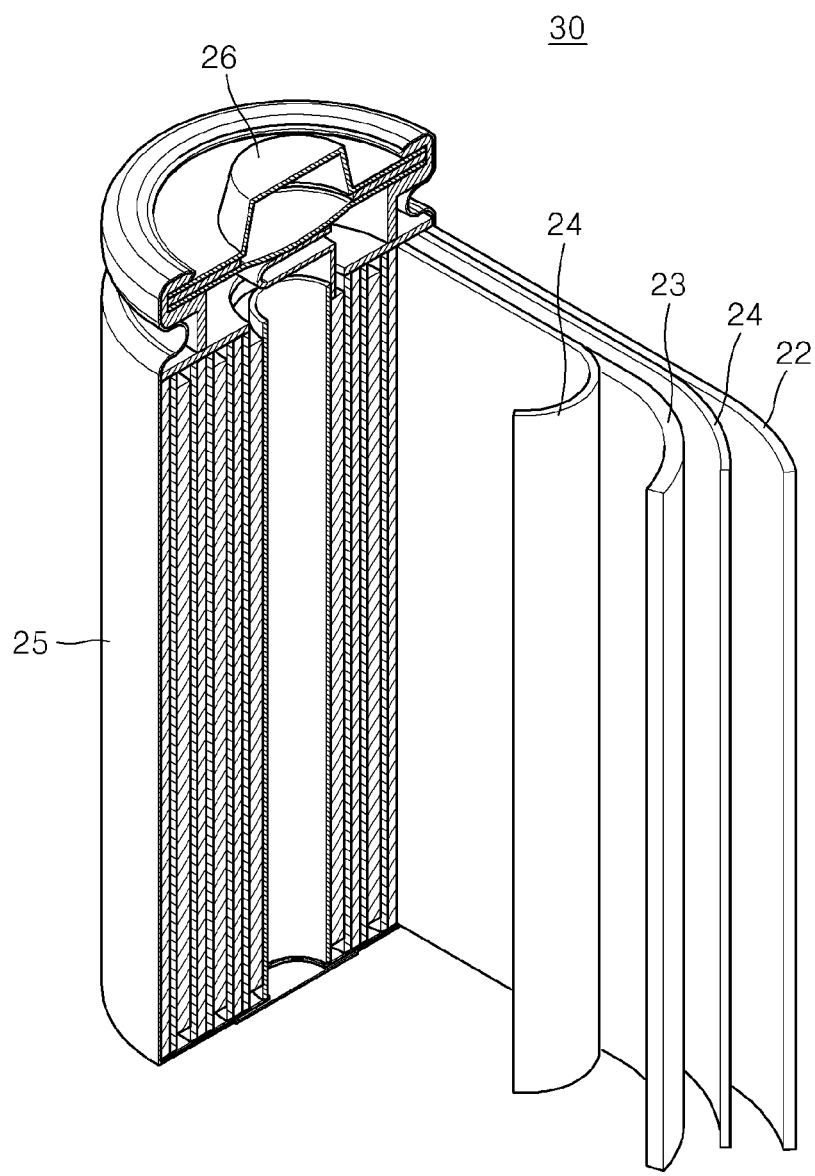
FIG. 1 is a schematic view of an embodiment of a lithium battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a lithium titanium oxide, methods of preparing the lithium titanium oxide, a negative electrode including the lithium titanium oxide, and a lithium battery including the negative electrode according to an embodiment is described in further detail.

The lithium titanium oxide may have a FWHM1/FWHM2 of about 1.70 or less at a spinning rate of about 5 kiloHertz (kHz) to about 50 kHz at an angle of about 54.7 degrees relative to the primary magnetic field.

In this regard, FWHM1 is a full width at half maximum of a $^7$Li peak present at about −10 parts per million (ppm) to about +10 ppm in a solid state-nuclear magnetic resonance (SS-NMR) spectrum of the lithium titanium oxide, and FWHM2 is a full width at half maximum of $^7$Li peak present about −10 ppm to about +10 ppm in a SS-NMR spectrum of a lithium chloride standard reagent (STD), and FWHM1 and FWHM2 are measured at the same spinning rate.

For example, the FWHM1/FWHM2 of the lithium titanium oxide at a spinning rate of about 3 kHz to about 7 kHz may be about 1.60 or less, specifically about 1 to about 1.60, for example, about 1.55 or less. For example, the FWHM1/FWHM2 of the lithium titanium oxide at a spinning rate of about 5 kHz may be about 1.55 or less, but is not limited thereto.

For example, the FWHM1/FWHM2 of the lithium titanium oxide at a spinning rate of about 13 kHz to about 17 kHz may be about 1.65 or less, specifically about 1 to about 1.65, for example, about 1.62 or less. For example, the FWHM1/FWHM2 of the lithium titanium oxide at a spinning rate of about 15 kHz may be about 1.62 or less or about 1.60 or less, but is not limited thereto.

For example, the FWHM1/FWHM2 of the lithium titanium oxide at a spinning rate of about 23 kHz to about 27 kHz may be about 1.73 or less, specifically about 1 to about 1.73, for example, about 1.70 or less. For example, the FWHM1/FWHM2 of the lithium titanium oxide at a spinning rate of about 25 kHz may be about 1.70 or less or about 1.68 or less, but is not limited thereto.

A lithium titanium oxide having the above-defined values of FWHM1/FWHM2 has excellent purity and crystallinity. For example, the lithium titanium oxide may be a spinel-type compound, and may have a spinel structure.

Lithium titanium oxide may be prepared by using various methods, and during the preparation, unintended additional phases may be generated. For example, when spinel-type $Li_4Ti_9O_{12}$ is manufactured, in fact, various additional phases, for example, $LiTiO_2$ (cubic), $LiTiO_2$ (hexagonal), $Li_2TiO_3$ (cubic), $Li_2TiO_3$ (monoclinic), and/or $Li_{1.03}Ti_{1.9}O_4$ may be formed. However, such additional phases are not identified by using a typical analysis method, such as X-ray diffraction (see Evaluation Example 2 below), and a method that substantially or effectively prevents the formation of such additional phases has not been previously disclosed.

Disclosed herein is a method of preparing a lithium titanium oxide in which substantially or effectively all lithium included in the lithium titanium oxide satisfying the above-defined values of FWHM1/FWHM2 is present in a substantially same chemical binding environment, and thus, the lithium titanium oxide has a single phase and the above mentioned additional phases are substantially or effectively absent. Accordingly, because the lithium titanium oxide satisfying the above-defined values of FWHM1/FWHM2 has high purity and crystallinity, the lithium titanium oxide provides improved electrical characteristics, for example, improved capacity, and improved high-rate characteristics, including improved high-rate capacity. Thus, when the lithium titanium oxide is used, a lithium battery having improved performance may be obtained.

The lithium titanium oxide may further include a first component that does not substantially bind to lithium, titanium, or oxygen, which are included in the lithium titanium oxide. In this regard, the first component may include at least one selected from phosphorus (P) and potassium (K).

The first component does not substantially bind to lithium, titanium, or oxygen. Accordingly, when the lithium titanium oxide further includes the first component, the lithium titanium oxide may not include an additional phase, such as an oxide phase of the first component, as may be confirmed by X-ray diffraction (XRD) analysis of the lithium titanium oxide (see Evaluation Example 2 below).

When the lithium titanium oxide further includes the first component, the first component may be present either in a lattice of the lithium titanium oxide (e.g., substitutionally or interstitially), or among crystals of the lithium titanium oxide.

When the first component includes phosphorus (P), an amount of the phosphorus (P) may be about 0.01 weight percent (wt %) to about 0.15 wt %, for example, about 0.10 wt % to about 0.14 wt %, based on a total weight the lithium titanium oxide.

When the first component includes potassium (K), an amount of the potassium (K) may be about 0.01 wt % to about 0.18 wt %, for example, about 0.1 wt % to about 0.15 wt %, based on a total weight of the lithium titanium oxide.

Also, the first component may include at least one of zirconium (Zr) and sulfur (S).

When the first component includes zirconium (Zr), an amount of the zirconium (Zr) may be about 0.03 wt % to about 0.10 wt %, for example, about 0.05 wt % to about 0.07 wt %, based on a total weight of the lithium titanium oxide.

When the first component includes sulfur (S), an amount of the sulfur (S) may be about 0.02 wt % to about 0.10 wt %, for example, about 0.03 wt % to about 0.06 wt %, based on a total weight of the lithium titanium oxide.

The first component may be derived from a titanium-containing precursor which is used in preparing the lithium titanium oxide. This is described in further detail below.

The lithium titanium oxide may be represented by Formula 1:

$$Li_{4+x}Ti_{5-y}M_zO_{12-n} \qquad \text{Formula 1}$$

wherein in Formula 1,

−0.2≤x≤0.2; −0.3≤y≤0.3; 0≤z≤0.3; −0.3≤n≤0.3, and M is at least one selected from lithium (Li), calcium (Ca), strontium (Sr), chromium (Cr), vanadium (V), iron (Fe), zirconium (Zr), zinc (Zn), silicon (Si), yttrium (Y), niobium (Nb), gallium (Ga), molybdenum (Mo), tungsten (W), barium (Ba), lanthanum (La), cerium (Ce), tantalum (Ta), hafnium (Hf), ruthenium (Ru), antimony (Sb), and arsenic (As).

For example, in Formula 1, x, y, z, and n may be −0.1≤x≤0.1; −0.1≤y≤0.1; z=1; and −0.1≤n≤0.1, and x, y, z, and n are not limited to the foregoing ranges.

For example, the lithium titanium oxide may be $Li_4Ti_9O_{12}$.

A method of preparing the lithium titanium oxide according to an embodiment includes preparing a mixture including a lithium-containing precursor and a titanium-containing precursor; and heat treating the mixture to prepare the lithium titanium oxide, wherein the titanium-containing precursor includes a second component, which includes at least one selected from phosphorus (P) and potassium (K).

The lithium-containing precursor may be at least one lithium salt. Examples of the lithium salt include lithium carbonate ($Li_2CO_3$), lithium sulfate ($Li_2SO4$), lithium nitrate ($LiNO_3$), and lithium hydroxide (LiOH), but the lithium-containing precursor is not limited thereto.

The titanium-containing precursor may be a titanium oxide ($TiO_2$)-based precursor, a titanium hydroxide ($Ti(OH)_4$)-based precursor, or the like, but is not limited thereto.

The titanium-containing precursor may include the second component.

The second component may include at least one selected from phosphorus (P) and potassium (K).

When the second component includes phosphorus (P), an amount of the phosphorus (P) may be about 0.01 wt % to about 0.15 wt %, for example, about 0.10 wt % to about 0.14 wt %, based on a total weight of the titanium-containing precursor.

When the second component includes potassium (K), an amount of the potassium (K) may be about 0.01 wt % to about 0.18 wt %, for example, about 0.1 wt % to about 0.15 wt %, based on a total weight of the titanium-containing precursor.

Also, the second component may include at least one selected from zirconium (Zr) and sulfur (S).

When the second component includes zirconium (Zr), an amount of the zirconium (Zr) may be about 0.03 wt % to about 0.10 wt %, for example, about 0.05 wt % to about 0.07 wt %, based on a total weight of the titanium-containing precursor.

When the second component includes sulfur (S), an amount of the sulfur (S) may be about 0.02 wt % to about 0.10 wt %, for example, about 0.03 wt % to about 0.06 wt %, based on a total weight of the titanium-containing precursor.

The lithium-containing precursor and the titanium-containing precursor may be mixed by various known methods using, for example, a ball mill, a Bambari mixer, a homogenizer, or the like.

The mixing time may vary according to the composition and amount of the precursors included in the mixture, and for example, the mixing may be performed for about 20 minutes to about 10 hours, for example, about 30 minutes to about 3 hours.

A ratio of the lithium-containing precursor to the titanium-containing precursor may be selected to obtain, for example, the lithium titanium oxide of Formula 1. For example, an amount of the titanium-containing precursor may be about 0.9 to about 2.7 moles, specifically about 1 to about 2.5 moles, based on 1 mole of the lithium-containing precursor.

The mixture including the lithium-containing precursor and the titanium-containing precursor is heat treated to obtain the lithium titanium oxide as is further described above.

Heat treatment conditions may be selected according to the composition and amounts of the lithium-containing precursor and the titanium-containing precursor included in the mixture, and for example, the heat treatment may be performed in air or in oxygen at a temperature of about 400 to about 1000° C. (for example about 650 to about 900° C.) for about 1 to about 50 hours, specifically about 3 to about 7 hours.

An average particle diameter (D50) of the lithium titanium oxide may be about 0.1 to about 30 μm, for example about 0.1 to about 1 μm. If the average particle diameter (D50) of the lithium titanium oxide is within this range, a ratio of the surface area of a conductive agent to the surface area of a negative active material in a negative active material including the lithium titanium oxide may be increased, and thus, an electrode conductivity may be improved and high-rate discharge characteristics may be improved.

The term "average particle diameter (D50)" refers to a diameter of a particle whose cumulative particle diameter ratio is 50% when the total volume of lithium titanium oxide particle powder is referred to as 100%, and is an average particle diameter based on volume measured using a wet laser and performed using a laser-type particle size distribution measurement device, for example as is provided by a MICRO TRACK HRA (Nikiso Co., Ltd).

The second component included in the titanium-containing precursor may suppress the formation of additional phases when the spinel-type lithium titanium oxide is prepared. Accordingly, when the titanium-containing precursor is used, a spinel-type lithium titanium oxide satisfying the above-defined values of the FWHM1/FWHM2 may be prepared.

When the lithium titanium oxide further includes the first component, the first component may be derived from the second component included in the titanium-containing precursor. That is, when a lithium titanium oxide is prepared using the titanium-containing precursor including the second component, a portion of the second component (for example, substantially all of the second component) may remain in the lithium titanium oxide, and thus, may be detected as the first component included in the lithium titanium oxide.

The lithium titanium oxide may be used as a negative active material in a lithium battery. The lithium battery may be a high capacity lithium battery that stores and supplies grid-scale electric power for novel generation methods, such as solar heat or wind power, and may be used as power source for driving motors of high-performance hybrid vehicles and electric vehicles.

Accordingly, a negative electrode according to an embodiment includes the lithium titanium oxide. The lithium titanium oxide may be used as a negative active material.

The negative electrode may further include a binder, in addition to the lithium titanium oxide, to provide a negative active material.

The binder may aid binding between the negative active material and, for example, a conductive agent, and binding between the negative active material and a current collector, and the binder may be used in an amount of about 1 to about 10 parts by weight, based on 100 parts by weight of the negative active material. Examples of the binder include polyvinylidene fluoride, polyvinylalcohol, carboxymethylcellulose (CMC), starch, hydroxypropylcellulose, regenerated cellulose, polyvinylpyrrolidone, tetrafluoroethylene, polyethylene, polypropylene, ethylene-p-diene terpolymer (EPDM), sulfonated EPDM, styrene butylene rubber, and a fluorinated rubber, and various copolymers thereof. A combination comprising at least one of the foregoing may be used.

An amount of the binder may be about 2 to about 7 parts by weight, based on 100 parts by weight of the negative active material. When the amount of the binder is within this range, an adhesion of a negative active material layer to a current collector may be enhanced.

The negative electrode may further include a conductive agent.

Any suitable conductive agent may be used and the conductive agent is not particularly restricted as long as it does not cause undesirable effects, such as undesirable chemical changes in a battery, and has sufficient conductivity.

An amount of the conductive agent may be, for example about, 0.5 to about 5 parts by weight, for example, about 0.01 to about 3 parts by weight, based on 100 parts by weight of the negative active material. If the amount of the conductive agent is within this range, conductive characteristics of a negative electrode may be improved.

The conductive agent may include any suitable carbon, for example at least one carbonaceous conductive agent selected from carbon black, carbon fiber, and graphite, and may comprise an amorphous carbon, a crystalline or graphitic carbon, or a vitreous or glassy carbon. The carbon black may be at least one selected from, for example, acetylene black, SUPER P, channel black, furnace black, lamp black, Ketjen black, and thermal black. The graphite may comprise a natural graphite or an artificial graphite, and may be a pyrolytic graphite. The conductive agent may comprise at least one selected from a mesocarbon, a single wall nanotube, and a multi wall nanotube. A combination including at least one of the foregoing conductive agents may be used. Also, the conductive agent may be in any suitable form, and may be in the form of a powder, fiber, or flake, and may have any suitable crystallographic orientation, crystallite size, interlayer spacing, density, particle size, or particle shape.

The negative electrode may further include an additional conductive agent other than the carbonaceous conductive agent.

The additional conductive agent may be at least one selected from a conductive fiber, such as metal fiber; a metal powder, such as aluminum powder, and nickel powder; a conductive whisker such as zinc oxide and potassium titanate; a carbon fluoride powder, and a polyphenylene derivative.

The negative electrode may further include, in addition to the lithium titanium oxide that has been disclosed as a negative active material, an additional negative active material that is suitable for use in a secondary lithium battery.

The additional negative active material may be at least one selected from a carbonaceous material, such as graphite or carbon, lithium metal, an alloy thereof, and a silicon oxide-based material, which can intercalate and deintercalate lithium ions, may be used.

A lithium battery according to an embodiment includes a negative electrode including the lithium titanium oxide.

The lithium battery may have excellent electrical characteristics, for example, high capacity and high-rate discharge characteristics, including high-rate discharge capacity.

High-rate discharge characteristics are evaluated using a ratio of an actual discharge capacity when a cell at a 100% state of charge is discharged with a first current for completely discharging the cell in a first selected period of time (for example, a time less than 10 hours) with respect to an actual discharge capacity when a cell at a 100% state of a charge is discharged with a second current for completely discharging the cell in a second selected period of time (for example, for 10 hours). In an embodiment, high-rate discharge is evaluated at a rate of 0.2 C to 10 C.

The negative electrode may be manufactured by, for example, the following method.

First, a composition for forming a negative active material layer, including the lithium titanium oxide and a solvent is prepared.

The composition may further include the binder described above, a conductive agent, the additional negative active material, or the like.

Then, the composition is coated on a negative electrode current collector, followed by drying, thereby completing the manufacture of the negative electrode.

A thickness of the negative electrode current collector may be about 3 to about 500 μm. The negative electrode current collector is not particularly restricted as long as it does not cause unsuitable chemical changes in a corresponding battery and has suitable conductivity. The negative electrode current collector may comprise, for example, at least one selected from copper, stainless steel, aluminum, nickel, titanium, heat treated carbon, copper or stainless steel comprising carbon, nickel, titanium, and silver, and the like. On a surface thereof, an alloy of aluminum and cadmium, or the like may be used. Also, a fine uneven or modulated structure may be disposed on the surface to enhance adhesion with a negative active material, and the negative electrode current collector may be used in various forms, such as a film, a sheet, a foil, a net, a porous structure, a foam, a non-woven fabric, or the like.

The solvent may comprise at least one selected form N-methylpyrrolidone (NMP), acetone, and water. An amount of the solvent may be about 1 to about 50 parts by weight, based on 100 parts by weight of the lithium titanium oxide. If the amount of the solvent is within this range, an active material layer may be easily formed.

A secondary lithium battery according to an embodiment includes the negative electrode described above. An example of a method of manufacturing the secondary lithium battery according to an embodiment is described in further detail below.

The negative electrode may be manufactured as described above and a positive electrode may be manufactured as follows.

Like the process of manufacturing the negative electrode, the positive electrode may be manufactured by disposing (e.g., coating) a composition for forming a positive active material layer on a current collector, followed by drying.

A positive electrode may be, like the process for manufacturing the negative electrode, formed by coating a composition for forming a positive active material layer on a current collector, followed by drying.

A composition for forming the positive active material layer may be prepared by combining a positive active material, a conductive agent, a binder, and a solvent.

The positive active material may be a lithium transition metal oxide, such as a commercially available positive active material for use in a lithium battery.

The conductive agent, the binder, and the solvent may be used in the same amounts as used in preparing the negative electrode.

The lithium transition metal oxide used as the positive active material oxide may include at least one selected from $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ (where, $0\leq Y<1$), $LiMn_{2-z}Ni_zO_4$, $LiMn_{2-z}Co_zO_4$ (where, $0<Z<2$), $LiCoPO_4$, and $LiFePO_4$.

The positive electrode current collector may have a thickness of about 3 to about 500 μm, and is not particularly restricted as long as it does not cause undesirable chemical changes in a corresponding battery and has suitable conductivity. For example, the positive electrode current collector may comprise stainless steel, aluminum, nickel, titanium, heat treated carbon, an aluminum or stainless steel comprising carbon, nickel, titanium, and silver, and the like. The positive electrode current collector may have a fine uneven or modulated structure on its surface to increase adhesion of the positive active material. The positive electrode current collector may be in the form of a film, a sheet, a foil, a net, a porous structure, a foam, a non-woven fabric, or the like.

A separator is interposed between the positive electrode and the negative electrode, such as those prepared above, and then an organic electrolyte is supplied thereto, thereby completing the manufacture of a secondary lithium battery.

For example, the negative electrode, a separator, and the positive electrode may be sequentially stacked on each other and then, the resulting structure may be wound or folded and placed in a cylindrical or rectangular battery case or a pouch, followed by adding an organic electrolyte into the battery case or pouch, thereby completing the manufacture of a secondary lithium battery.

The separator may have a pore diameter of about 0.01 to about 10 μm, and a thickness of, about 5 to about 300 μm. For example, the separator may be in the form of a sheet or non-woven fabric comprising an olefin-based polymer, such as polypropylene, polyethylene, or the like; or a glass fiber, but is not limited thereto.

The organic electrolyte may be prepared by dissolving a lithium salt in an organic solvent.

The organic solvent may comprise at least one selected from propylenecarbonate, ethylenecarbonate, fluoroethylenecarbonate, butylenecarbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofurane, 2-methyltetrahydrofurane, γ-butyrolactone, dioxolane, 4-methyldioxolane, N,N-dimethylformamide, dimethylacetamide, dimethylsufloxide, dioxane, 1,2-dimethoxyethane, sulforane, dichloroethane, chlorobenzene, nitrobenzene, diethyleneglycol, and dimethylether.

The lithium salt may at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}O_2)$ (x and y are natural numbers), LiCl, and LiI.

According to another embodiment, the secondary lithium battery may comprise, in addition to the separator, an organic solid electrolyte and/or an inorganic solid electrolyte. When the organic solid electrolyte and/or inorganic solid electrolyte are used, in some embodiments, the solid electrodes may act as a separator and in this case, the separator may not be used.

The organic solid electrolyte may be, for example, a polyethylene derivative, a polyethylene oxide derivative, a polypropylene oxide derivative, a phosphoric acid ester polymer, polyester sulfide, polyvinyl alcohol, polyvinylidene fluoride, or the like.

The inorganic solid electrolyte may comprise, for example, at least one selected from a nitride, halide, or sulfide of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$, and the like.

FIG. 1 is a schematic view of a secondary lithium battery 30 according to an embodiment.

Referring to FIG. 1, the secondary lithium battery 30 includes a positive electrode 23, a negative electrode 22 and a separator 24 interposed between the positive electrode 23 and the negative electrode 22. An electrolyte (not shown) contacts the positive electrode 23, the negative electrode 22 and the separator 24. The foregoing are disposed in a battery case 25, and a sealing member 26 seals the battery case 25. The secondary lithium battery 30 may be formed by sequentially stacking the positive electrode 23, the negative electrode 22, and the separator 24, and winding the stack structure in a jelly-roll form, followed by placing the roll in the battery case 25.

Hereinafter, an embodiment is disclosed in further detail by way of examples.

EXAMPLES

Preparation Example 1

Preparation of LTO-A

The Lithium-containing precursor $Li_2CO_3$ and the titanium-containing precursor $TiO_2$-A ($TiO_2$ containing such amounts of elements as shown in Table 1 as a second component) were weighed at a molar ratio of 2:5, and then ball-milled using a beads ball-miller. The mixture was subjected to spray-drying and then heat treated in a box furnace under in air at a temperature of 850° C. for 5 hours to obtain $Li_4Ti_5O_{12}$ (hereinafter referred to as "LTO") powder having an average particle diameter ($D_{50}$) of 5.432 μm. This product was named as "LTO-A".

Preparation Example 2

Preparation of LTO-B

LTO powder having an average particle diameter ($D_{50}$) of 22.964 μm was prepared in the same manner as in Preparation Example 1, except that $TiO_2$-B ($TiO_2$ containing such amounts of elements as shown in Table 1 as a second component) was used instead of $TiO_2$-A as the titanium-containing precursor. This product was named as "LTO-B".

Comparative Preparation Example 1

Preparation of LTO-C

LTO powder having an average particle diameter (D50) of 6.324 μm was prepared in the same manner as in Preparation Example 1, except that $TiO_2$—C (anantase $TiO_2$ manufactured by Aldrich Company, which is a $TiO_2$ containing such amounts of elements as shown in Table 1 as a second component) was used instead of $TiO_2$-A as the titanium-containing precursor. This product was named as "LTO-C".

Comparative Preparation Example 2

Preparation of LTO-D

LTO powder having an average particle diameter (D50) of 7.124 μm was prepared in the same manner as in Preparation Example 1, except that LiOH was used as the lithium-containing precursor, $TiO_2$—C was used instead of $TiO_2$-A as the titanium-containing precursor, and a molar ratio of LiOH to $TiO_2$—C was adjusted to be 4:5. This product was named as "LTO-D".

ICP analysis (ICP-AES, ICPS-8100, SHIMADZU/RF source 27.12 megaHertz (MHz)/sample uptake rate 0.8 milliliters per minute, mL/min) was performed on $TiO_2$-A, $TiO_2$-B, and $TiO_2$—C prepared according to Preparation Examples 1 and 2 and Comparative Preparation Examples 1 and 2 (an amount of Ti was not shown), and results thereof are shown in Table 1 below (In Table 1, a content of each element is in weight percent (wt %), based on a total weight of the Ti-containing precursor.) In this regard, $TiO_2$-A and $TiO_2$-B contained the amounts of elements shown in Table 1 as a second component.

TABLE 1

| Ti-containing precursor | Na | Mg | Al | P | K | Cr | Co | Zr | S |
|---|---|---|---|---|---|---|---|---|---|
| $TiO_2$-A (used when LTO-A was prepared) | 0.021 | — | 0.009 | 0.123 | 0.161 | — | — | 0.075 | 0.066 |
| $TiO_2$-B (used when LTO-B was prepared) | 0.012 | — | 0.006 | 0.156 | 0.127 | — | — | 0.065 | 0.055 |
| $TiO_2$-C (used when LTO-C and LTO-D were prepared) | 0.014 | — | — | — | — | — | — | 0.023 | 0.015 |

Referring to Table 1, it was confirmed that $TiO_2$-A and $TiO_2$-B included P and K, and $TiO_2$—C did not include P and K. Also, it was confirmed that amounts of Zr and S in $TiO_2$-A and $TiO_2$-B were respectively greater than amounts of Zr and S in $TiO_2$—C. $TiO_2$-A and $TiO_2$-B included such amounts of elements shown in Table 1 as a second component.

Example 1

Production of LTO-A-Containing Negative Electrode and Coin Half Cell 0.4 g of a binder solution of 5 wt % polyvinylidene fluoride (PVdF) dissolved in N-methylpyrrolidone (NMP) was added to 0.98 g of LTO-A of Preparation Example 1, followed by mechanically mixing to obtain a slurry (a weight ratio of LTO-A PVdF was 98:2).

The slurry was coated on an aluminum foil having a thickness of 90 μm and then vacuum dried at a temperature of 120° C. to manufacture a negative electrode.

Hereinafter, the negative electrode was wound to a form a circle having a diameter of 12 millimeters (mm), and then a 2032-type coin half cell was manufactured using the wound negative electrode and lithium metal (foil) as a reference electrode. In this case, as an electrolyte, 1.3 molar (M) $LiPF_6$ dissolved in a mixed solvent including ethylenecarbonate, diethylenecarbonate, and dimethylethylcarbonate in a volume ratio of 3:5:2 was used.

Example 2

Production of LTO-B-Containing Negative Electrode and Coin Half Cell

A negative electrode and a coin half cell were manufactured in the same manner as in Example 1, except that LTO-B was used instead of LTO-A as the negative active material.

Comparative Example 1

Production of LTO-C-Containing Negative Electrode and Coin Half Cell

A negative electrode and a coin half cell were manufactured in the same manner as in Example 1, except that LTO-C was used instead of LTO-A as the negative active material.

Comparative Example 2

Production of LTO-D-Containing Negative Electrode and Coin Half Cell

A negative electrode and a coin half cell were MANUFACTURED in the same manner as in Example 1, except that LTO-D was used instead of LTO-A as the negative active material.

Evaluation Example 1

ICP analysis of LTO-A, LTO-B, LTO-C, and LTO-D

ICP analysis (ICP-AES, ICPS-8100, SHIMADZU/RF source 27.12 MHz/sample uptake rate 0.8 mL/min) was performed on LTO-A, LTO-B, LTO-C and LTO-D, and results thereof are shown in Table 2 (amounts of Li and Ti were not shown, also an amount of each element was evaluated as wt % based a total weight of the lithium titanium oxide). In this regard, LTO-A and LTO-B included such amounts of elements shown in Table 2 below as a first component.

tially similar to the kind and amount of the elements of the second component shown in Table 1 and included in $TiO_2$-A, $TiO_2$-B and $TiO_2$—C other than $TiO_2$. From the results, it was confirmed that the particular elements of the second component included in $TiO_2$-A, $TiO_2$-B and $TiO_2$—C substantially remained after the LTO was prepared, and the particular elements of the first component included in LTO-A, LTO-B, LTO-C and LTO-D were derived from the particular elements of the second component included in $TiO_2$-A, $TiO_2$-B and $TiO_2$—C.

Evaluation Example 2

X-Ray Diffraction (XRD) Analysis

Figure 2:
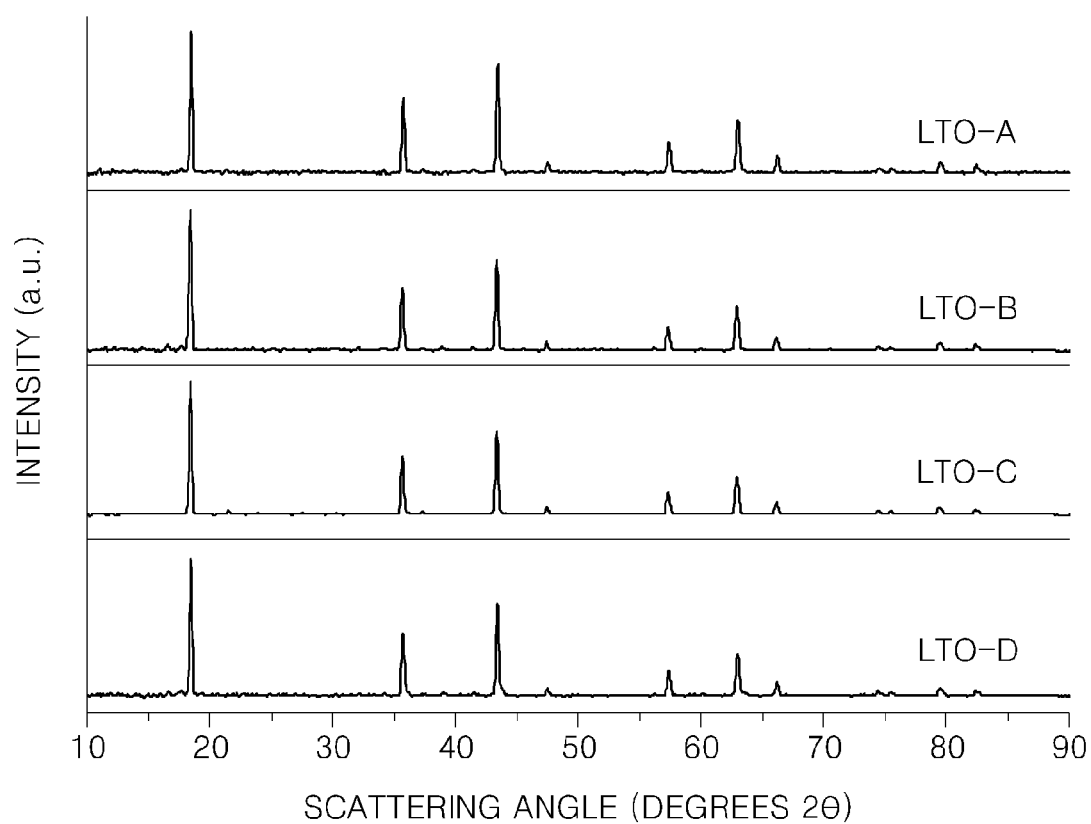
FIG. 2 is a graph of intensity (arbitrary units, a.u.) versus scattering angle, (degrees two-theta, 2θ) which shows X-ray diffraction spectra of LTO-A, LTO-B, LTO-C, and LTO-D prepared according to Preparation Examples 1 and 2 and Comparative Preparation Examples 1 and 2.

XRD analysis (MP-XRD, Xpert PRO, Philips/Power 3 kW) was performed on LTO-A, LTO-B, LTO-C, and LTO-D, and results thereof are shown in FIG. 2. Referring to FIG. 2, it was confirmed that the XRD spectra of LTO-A, LTO-B, LTO-C, and LTO-D were similar to each other.

Evaluation Example 3

Figure 3A:
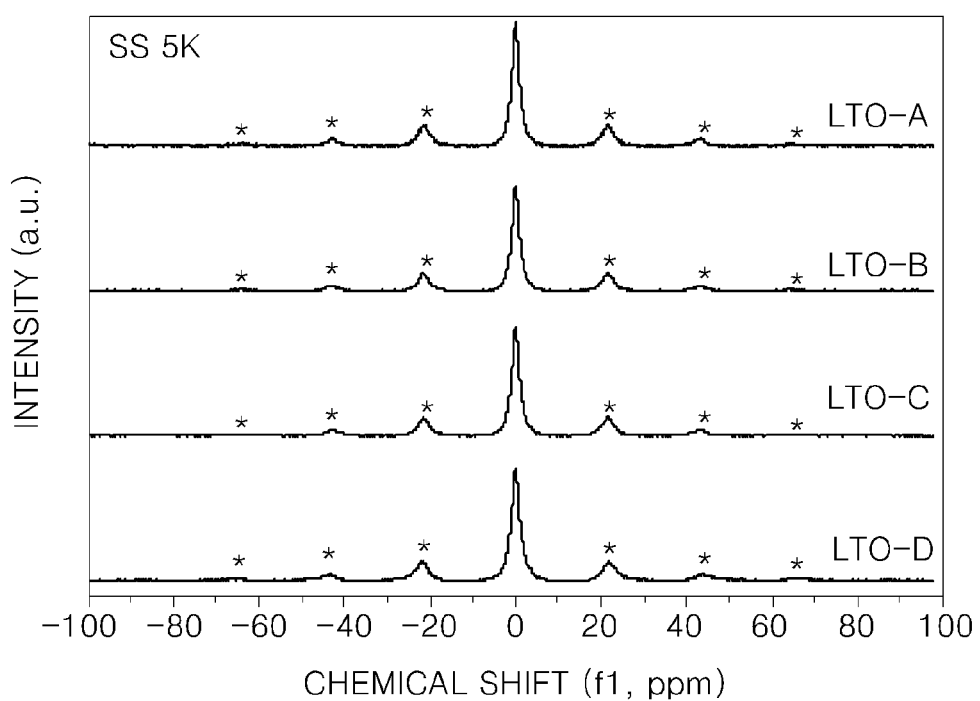
FIG. 3A is a graph of intensity (arbitrary units, a.u.) versus chemical shift, (f1, parts per million, ppm) and shows a $^7$Li solid state nuclear magnetic resonance (SS-NMR) spectrum showing $^7$Li peaks in the f1 dimension at about −10 ppm to about +10 ppm of LTO-A, LTO-B, LTO-C, and LTO-D prepared according to Preparation Examples 1 and 2 and Comparative Preparation Examples 1 and 2 at a spinning rate of 5 kHz.
Figure 3B:
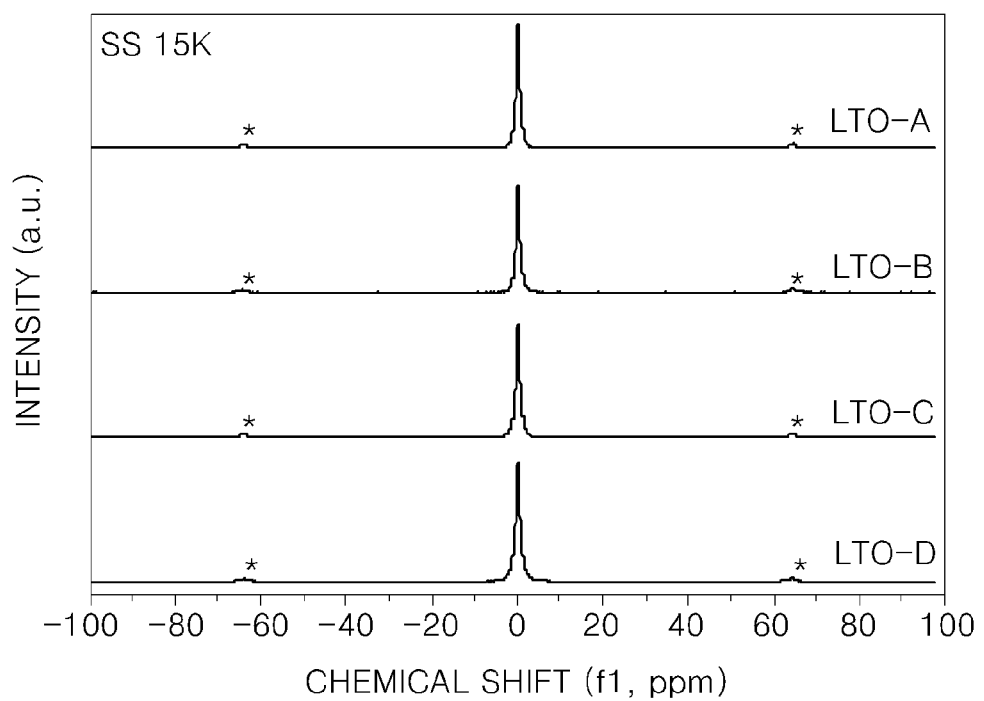
FIG. 3B is a graph of intensity (arbitrary units, a.u.) versus chemical shift, (f1, parts per million, ppm) and shows SS-NMR $^7$Li peaks in the f1 dimension at about −10 ppm to about +10 ppm of LTO-A, LTO-B, LTO-C, and LTO-D prepared according to Preparation Examples 1 and 2 and Comparative Preparation Examples 1 and 2 at a spinning rate of 15 kHz.
Figure 3C:
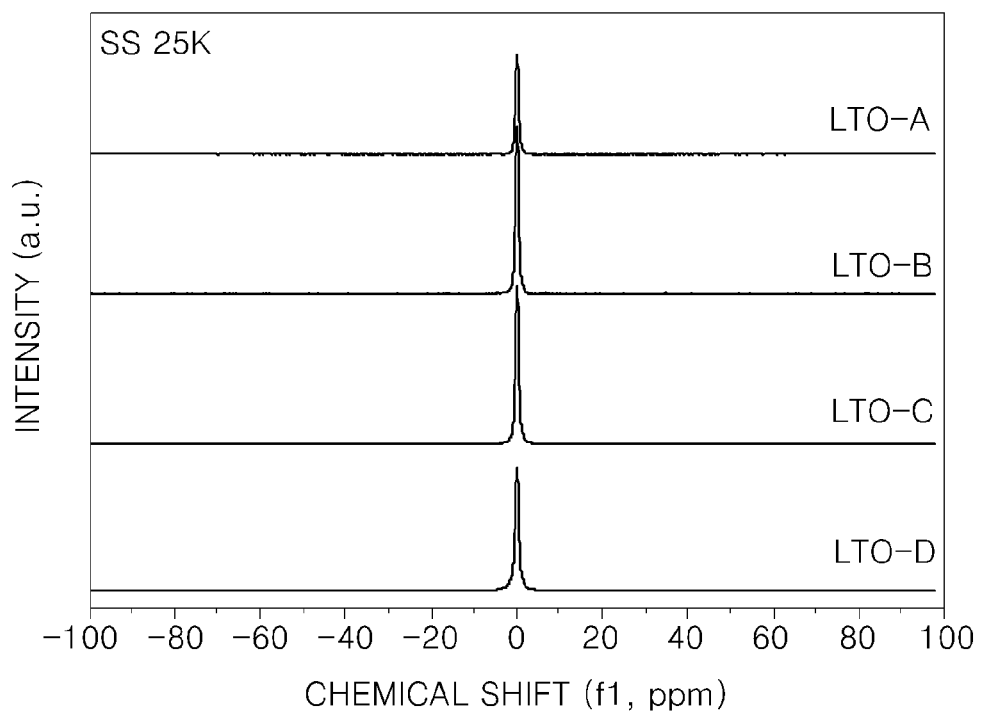
FIG. 3C is a graph of intensity (arbitrary units, a.u.) versus chemical shift, (f1, parts per million, ppm) and shows SS-NMR $^7$Li peaks in the f1 dimension at about −10 ppm to about +10 ppm of LTO-A, LTO-B, LTO-C, and LTO-D prepared according to Preparation Examples 1 and 2 and Comparative Preparation Examples 1 and 2 at a spinning rate of 25 kHz.
Figure 4A:
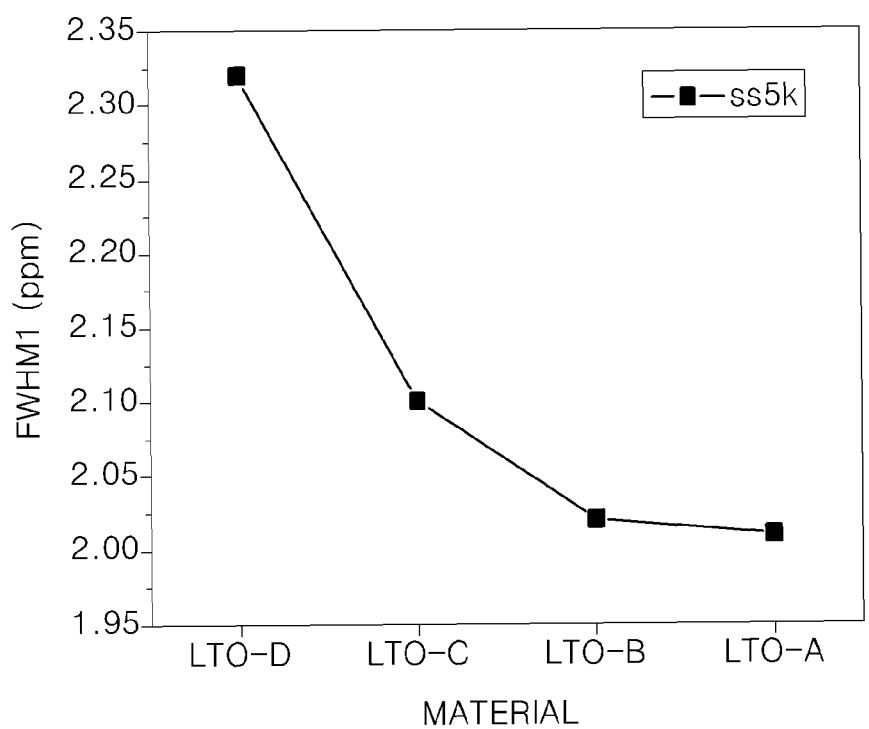
FIG. 4A is a graph of full width at half maximum 1 (FWHM1, parts per million, ppm) for the materials LTO-A, LTO-B, LTO-C, and LTO-D which shows SS-NMR $^7$Li peaks (about −10 ppm to about +10 ppm) of LTO-A, LTO-B, LTO-C, and LTO-D prepared according to Preparation Examples 1 and 2 and Comparative Preparation Examples 1 and 2 at a spinning rate of 5 kHz.
Figure 4B:
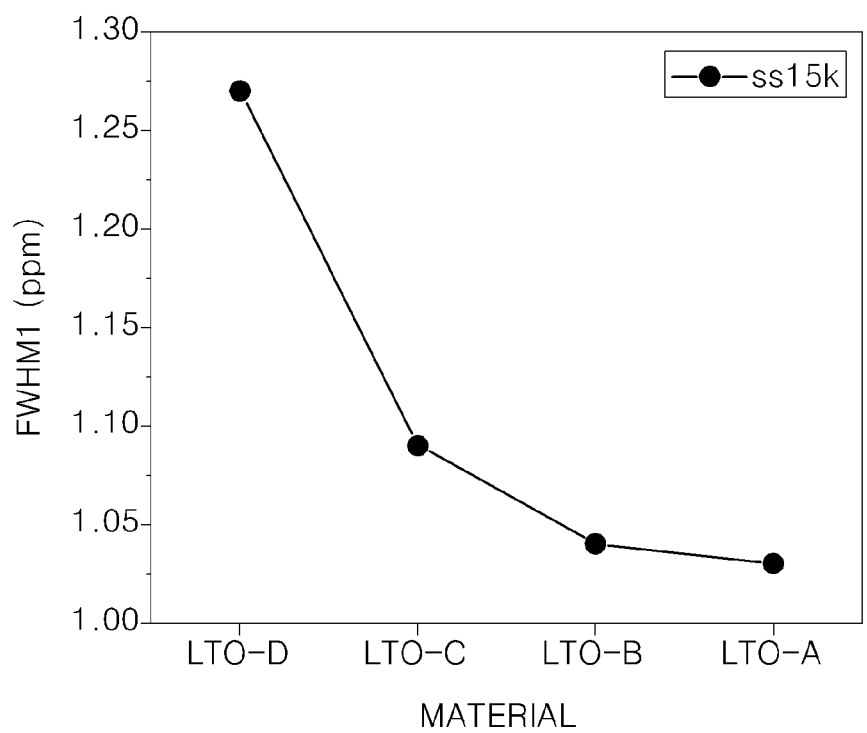
FIG. 4B is a graph of full width at half maximum 1 (FWHM1, parts per million, ppm) for the materials LTO-A, LTO-B, LTO-C, and LTO-D which shows SS-NMR$^7$Li peaks (about −10 ppm to about +10 ppm) of LTO-A, LTO-B, LTO-C, and LTO-D prepared according to Preparation Examples 1 and 2 and Comparative Preparation Examples 1 and 2 at a spinning rate of 15 kHz.
Figure 4C:
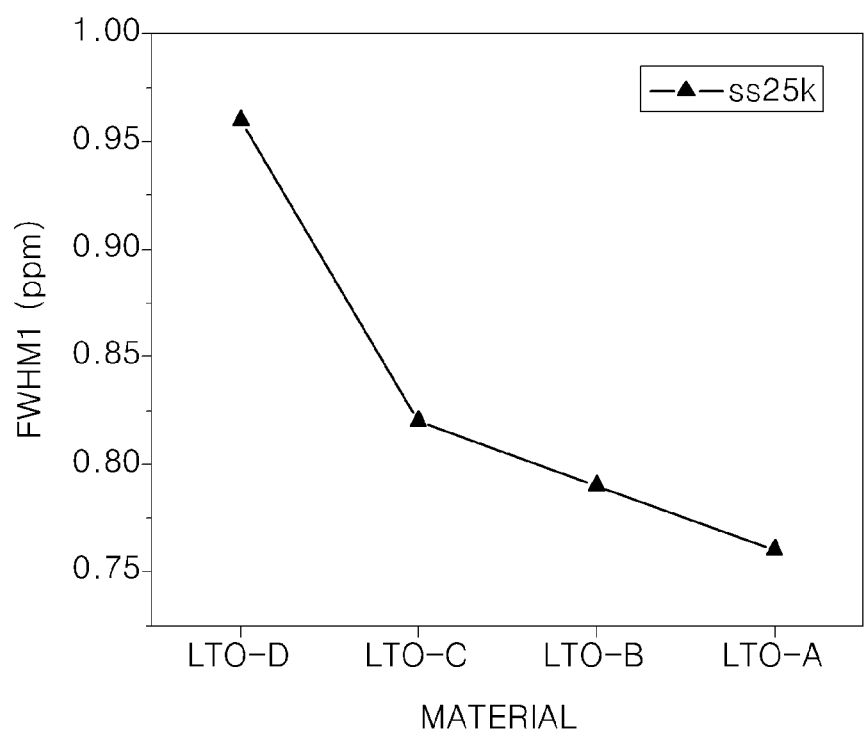
FIG. 4C is a graph of full width at half maximum 1 (FWHM1, parts per million, ppm) for the materials LTO-A, LTO-B, LTO-C, and LTO-D which shows SS-NMR $^7$Li peaks (about −10 ppm to about +10 ppm) of LTO-A, LTO-B, LTO-C, and LTO-D prepared according to Preparation Examples 1 and 2 and Comparative Preparation Examples 1 and 2 at a spinning rate of 25 kHz.

Solid State Nuclear Magnetic Resonance (SS-NMR) Analysis $^7Li$ SS-NMR analysis (Bruker NMR 600 MHz (AVANCE III)) was performed on LTO-A, LTO-B, LTO-C, and LTO-D at spinning rates of 5 kHz, 15 kHz, and 25 kHz, and results thereof are shown in FIGS. 3A (5 kHz), 3B (15 kHz), and 3C (25 kHz) (in FIGS. 3A, 3B, and 3C, * indicates a spinning side band), and a full width at half maximum (FWHM1) of a $^7Li$ peak is shown in FIGS. 4A (5 kHz), 4B (15 kHz), and 4C (25 kHz). Also, the full width at half maximum (FWHM1) of a $^7Li$ peak in an SS-NMR of LTO-A, LTO-B, LTO-C and LTO-D was divided by a full width at half

TABLE 2

| Sample | Ti-containing precursor | Na | Mg | Al | P | K | Cr | Co | Zr | S |
|---|---|---|---|---|---|---|---|---|---|---|
| LTO-A | $TiO_2$-A | 0.019 | — | 0.010 | 0.106 | 0.140 | — | — | 0.065 | 0.055 |
| LTO-B | $TiO_2$-B | 0.010 | — | 0.005 | 0.132 | 0.113 | — | — | 0.052 | 0.048 |
| LTO-C | $TiO_2$-C | 0.012 | — | 0.004 | — | — | 0.001 | 0.093 | 0.018 | 0.012 |
| LTO-D | | | | | | | | | | |

From Table 2, it was confirmed that the kind and amount of the elements of the first component included in LTO-A, LTO-B, LTO-C and LTO-D other than LTO were substanmaximum (FWHM2) of a $^7Li$ peak in an SS-NMR of lithium chloride standard reagent (standard, STD) and results thereof are shown in Table 3:

TABLE 3

| | FWHM1 (ppm) | | | FWHM1/FWHM2 | | |
|---|---|---|---|---|---|---|
| | spinning rate = 5 kHz | spinning rate = 15 kHz | spinning rate = 25 kHz | spinning rate = 5 kHz | spinning rate = 15 kHz | spinning rate = 25 kHz |
| lithium chloride STD | — | — | — | 1.00 | 1.00 | 1.00 |
| LTO-A | 2.01 | 1.03 | 0.76 | 1.53 | 1.58 | 1.62 |
| LTO-B | 2.02 | 1.04 | 0.79 | 1.54 | 1.60 | 1.68 |
| LTO-C | 2.10 | 1.09 | 0.82 | 1.60 | 1.68 | 1.74 |
| LTO-D | 2.32 | 1.27 | 0.96 | 1.77 | 1.95 | 2.04 |

Evaluation Example 4

Capacity Evaluation

Figure 5:
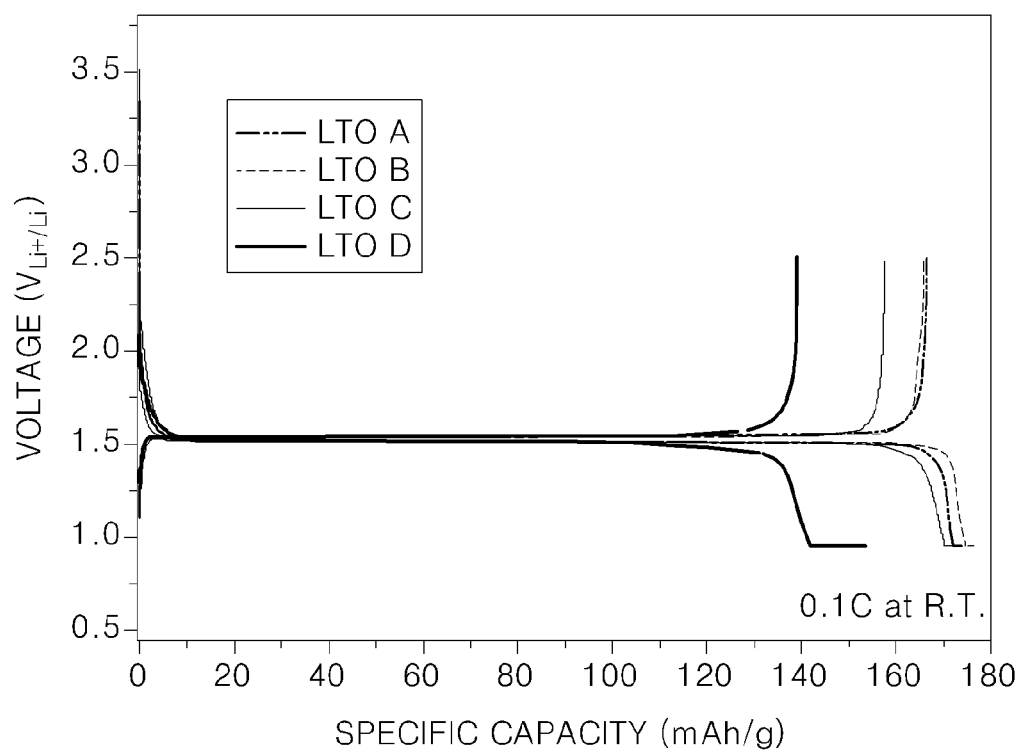
FIG. 5 is a graph of voltage (volts versus Li$^+$/Li) versus specific capacity (milliampere-hours per gram, mAh/g) showing initial charging and discharging of coin half cells manufactured according to Examples 1 and 2 and Comparative Examples 1 and 2.

Initial charge and discharge characteristics of the coin half cells manufactured according to Examples 1 and 2 and Comparative Examples 1 and 2 were evaluated by using a charging and discharging device (manufacturer: TOYO, and model: TOYO-3100), and results thereof are shown in FIG. 5 and Table 4. An initial discharge capacity was evaluated as follows: the coin half cells of Examples 1 and 2 and Comparative Examples 1 and 2 were, in a first cycle, charged at a rate of 0.1 C (unit: mA/g) until a voltage reached 1.0 V, and then further charged at a constant voltage of 1.0 V until a current reached 0.01 C, followed by 10 minutes of rest. Then, the coin half cells were discharged at a rate of 0.1 C until a voltage reached 2.5 V and a discharge capacity at this time was measured. The "C" refers to a discharge rate of a cell, and is a value (amount of current) obtained by dividing a total capacity of a cell by a discharge time. The charge and discharge efficiency shown in Table 4 were calculated according to "initial discharge capacity/initial charge capacity×100(%)."

TABLE 4

| | Negative active material | Initial discharge capacity (mAh/g) | Charge and discharge efficiency (%) |
|---|---|---|---|
| Example 1 | LTO-A | 166.4 | 95.7 |
| Example 2 | LTO-B | 166.0 | 94.1 |
| Comparative Example 1 | LTO-C | 157.5 | 91.4 |
| Comparative Example 2 | LTO-D | 139.1 | 90.6 |

From FIG. 5 and Table 4, it was confirmed that a specific discharge capacity of the half cells of Examples 1 and 2 were greater than a specific discharge capacity of the half cells of Comparative Examples 1 and 2.

Evaluation Example 5

High-Rate Discharge Characteristics Evaluation

Figure 6:
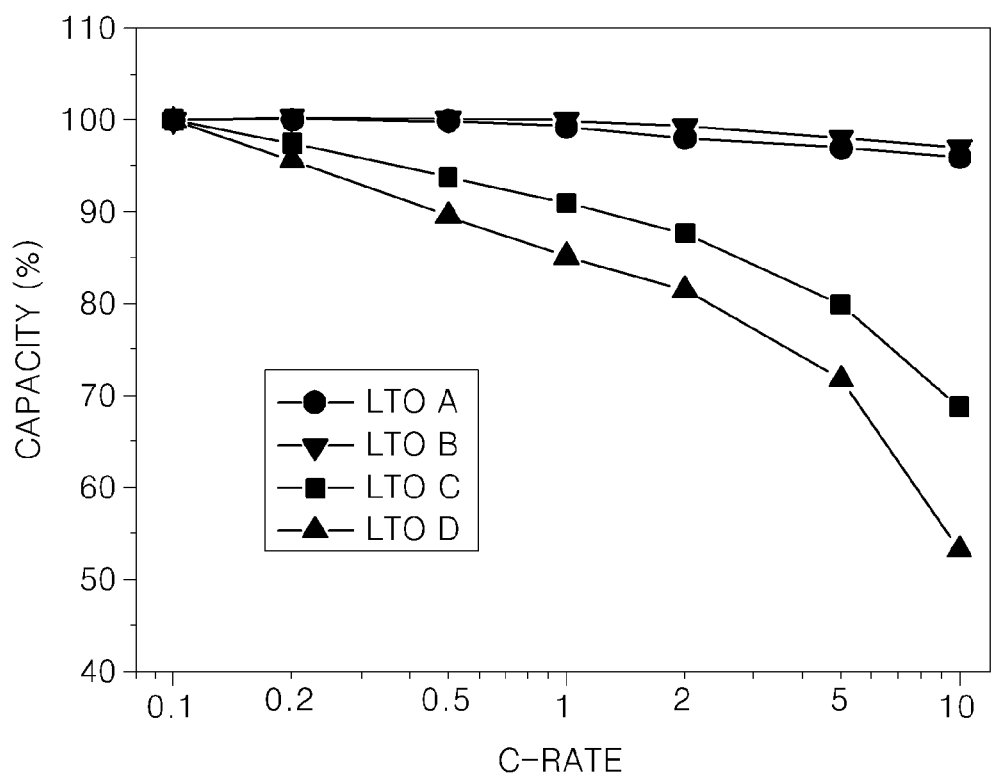
FIG. 6 is a graph of capacity (percent) versus rate (C-rate) showing high-rate discharge characteristics of coin half cells manufactured according to Examples 1 and 2 and Comparative Examples 1 and 2.

The coin half cells of Examples 1 and 2 and Comparative Examples 1 and 2 were charged under conditions of a constant current (0.1 C) and constant voltage (1.0 V, 0.01 C cut-off), followed by 10 minutes of rest. The coin half cells were discharged at the constant currents 0.1 C, 0.2 C, 0.5 C, 1 C, 2 C, 5 C, and 10 C until a voltage reached 2.5V to evaluate the high-rate discharge characteristics (rate capability) of the coin half cells. The results thereof are shown in FIG. 6 and Table 5. In Table 5, high-rate discharge characteristics under a selected constant current condition of the respective coin half cells may be calculated according to Equation 1 below.

high-rate discharge capacity (%)=(discharge capacity when a cell is discharged with a selected constant current)/(discharge capacitance when the cell is discharged at 0.1 C)×100%   Equation 1

TABLE 5

| High-rate discharge capacity (%), (rate-capability) | Example 1 (negative active material = LTO-A) | Example 2 (negative active material = LTO-B) | Comparative Example 1 (negative active material = LTO-C) | Comparative Example 2 (negative active material = LTO-D) |
|---|---|---|---|---|
| 0.1 C/0.1 C (%) | 100.0 | 100.0 | 100.0 | 100.0 |
| 0.2 C/0.1 C (%) | 100.1 | 100.3 | 97.5 | 95.6 |
| 0.5 C/0.1 C (%) | 99.9 | 100.2 | 93.7 | 89.5 |
| 1 C/0.1 C (%) | 99.3 | 99.9 | 90.9 | 85.1 |
| 2 C/0.1 C (%) | 98.1 | 99.3 | 87.6 | 81.5 |
| 5 C/0.1 C (%) | 97.0 | 98.0 | 79.9 | 71.8 |
| 10 C/0.1 C (%) | 96.0 | 97.0 | 68.8 | 53.2 |

Referring to FIG. 6 and Table 5, it was confirmed that the coin cells of Examples 1 and 2 provided improved high-rate discharge capacity than the coin cells of Comparative Examples 1 and 2. Thus the cells provided a greater percentage of their 0.1 C capacity than the comparative examples.

As confirmed from Evaluation Example 2 and FIG. 2, XRD spectra of LTO-A, LTO-B, LTO-C, and LTO-D were very similar to each other. However, as confirmed from Evaluation Example 3 and Table 3, a FWHM1/FWHM2 of LTO-A and LTO-B is 1.70 or less. The capacity and high-rate discharge capacity of the coin half cells of Examples 1 and 2 including LTO-A and LTO-B, as confirmed from Tables 4 and 5, are better than the capacity and high-rate discharge capacity of the coin half cells of Comparative Examples 1 and 2 including LTO-C and LTO-D (see the high-rate discharge capacity shown in Table 5). From these results, it was confirmed that even when lithium titanium oxides have the same or similar XRD spectra, the capacity and high-rate discharge capacity may vary according to the FWHM1/FWHM2 at a spinning rate of 5 kHz to 50 kHz in a solid state NMR spectrum. For example when the FWHM1/FWHM2 at a spinning rate of 5 kHz to 50 kHz in a solid state NMR spectrum is about 1.70 or less, excellent capacity and high-rate discharge capacity may be provided.

As described above, according an embodiment, a negative electrode including the lithium titanium oxide and a lithium battery including the negative electrode may have high capacity and excellent high-rate capacity.

It should be understood that the exemplary embodiments described herein shall be considered in a descriptive sense only and not for purposes of limitation. Descriptions of features, advantages, or aspects within each embodiment should be considered as available for other similar features or aspects in other embodiments.

What is claimed is:

1. A lithium titanium oxide spinel having a ratio of FWHM1/FWHM2 of about 1.70 or less at a spinning rate of about 5 kHz to about 50 kHz, wherein
    FWHM1 is a full width at half maximum of a $^7$Li peak present at about −10 parts per million to about +10 parts per million in a solid state-nuclear magnetic resonance spectrum of the lithium titanium oxide,
    FWHM2 is a full width at half maximum of a $^7$Li peak present at about −10 parts per million to about +10 parts per million in a solid state-nuclear magnetic resonance spectrum of a lithium chloride standard reagent, and
    FWHM1 and FWHM2 are measured at the same spinning rate, and
    wherein the lithium titanium oxide further comprises a first component which comprises phosphorus and potassium.

2. The lithium titanium oxide of claim 1, wherein the ratio of FWHM1/FWHM2 at a spinning rate of about 3 kiloHertz to about 7 kiloHertz is about 1.60 or less.

3. The lithium titanium oxide of claim 1, wherein the ratio of FWHM1/FWHM2 at a spinning rate of 5 kiloHertz is about 1.55 or less.

4. The lithium titanium oxide of claim 1, wherein the ratio of FWHM1/FWHM2 at the spinning rate of about 13 kiloHertz to about 17 kiloHertz is about 1.65 or less.

5. The lithium titanium oxide of claim 1, wherein the ratio of FWHM1/FWHM2 at a spinning rate of 15 kiloHertz is about 1.62 or less.

6. The lithium titanium oxide of claim 1, wherein the ratio of FWHM1/FWHM2 at a spinning rate of about 23 kiloHertz to about 27 kiloHertz is about 1.68 or less.

7. The lithium titanium oxide of claim 1, wherein the ratio of FWHM1/FWHM2 at a spinning rate of 25 kiloHertz is about 1.70 or less.

8. The lithium titanium oxide of claim 1, wherein the first component does not bind to lithium, titanium, or oxygen.

9. The lithium titanium oxide of claim 8, wherein the first component is present either in a lattice unit of the lithium titanium oxide or among crystals of the lithium titanium oxide.

10. The lithium titanium oxide of claim 8, wherein
    an amount of the phosphorus (P) is about 0.01 weight percent to about 0.15 weight percent, based on a total weight of the lithium titanium oxide, and
    an amount of the potassium (K) is about 0.01 weight percent to about 0.18 weight percent, based on a total weight of the lithium titanium oxide.

11. The lithium titanium oxide of claim 8, wherein the first component further comprises at least one selected from the group consisting of zirconium (Zr) and sulfur (S).

12. The lithium titanium oxide of claim 11, wherein
    when the first component further comprises zirconium (Zr), an amount of the zirconium (Zr) is about 0.03 weight percent to about 0.10 weight percent, based on a total weight of the lithium titanium oxide, and
    when the first component further comprises sulfur (S), an amount of the sulfur (S) is about 0.02 weight percent to about 0.10 weight percent.

13. The lithium titanium oxide of claim 1, wherein the lithium titanium oxide is represented by Formula 1 below:

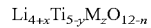

$$Li_{4+x}Ti_{5-y}M_zO_{12-n} \quad \text{Formula 1}$$

wherein in Formula 1,
    −0.2≤x≤0.2; −0.3≤y≤0.3; 0≤z≤0.3; −0.3≤n≤0.3, and M is at least one selected from the group consisting of lithium (Li), calcium (Ca), strontium (Sr), chromium (Cr), vanadium (V), iron (Fe), zirconium (Zr), zinc (Zn), silicon (Si), yttrium (Y), niobium (Nb), gallium (Ga), molybdenum (Mo), tungsten (W), barium (Ba), lanthanum (La), cerium (Ce), tantalum (Ta), hafnium (Hf), ruthenium (Ru), antimony (Sb), and arsenic (As).

14. A method of preparing the lithium titanium oxide spinel of claim 1 having a ratio of FWHM1/FWHM2 of about 1.70 or less at a spinning rate of about 5 kiloHertz to about 50 kiloHertz, the method comprising:
    preparing a mixture comprising a lithium-containing precursor and a titanium-containing precursor; and
    heat treating the mixture to prepare the lithium titanium oxide,
    wherein the titanium-containing precursor comprises a second component, which comprises phosphorus (P) and potassium (K), wherein
    FWHM1 is a full width at half maximum of a $^7$Li peak present at about −10 parts per million to about +10 parts per million in a solid state-nuclear magnetic resonance spectrum of the lithium titanium oxide,
    FWHM2 is a full width at half maximum of a $^7$Li peak present at about −10 parts per million to about +10 parts per million in a solid state-nuclear magnetic resonance spectrum of a lithium chloride standard reagent, and
    FWHM1 and FWHM2 are measured at the same spinning rate.

15. The method of claim 14, wherein
    an amount of the phosphorus (P) is about 0.01 weight percent to about 0.15 weight percent, based on a total weight of the titanium-containing precursor, and
    an amount of the potassium (K) is about 0.01 weight percent to about 0.18 weight percent, based on a total weight of the titanium-containing precursor.

16. The method of claim 14, wherein the second component further comprises at least one selected from the group consisting of zirconium (Zr) and sulfur (S).

17. The method of claim 14, wherein
the lithium titanium oxide further comprises a first component which does not bind to lithium, titanium, and oxygen, and
the first component is derived from the second component included in the titanium- containing precursor.

18. The method of claim 14, wherein the heat treating is performed in an oxygen comprising atmosphere at a temperature of about 400° C. to about 1000° C. for about 3 hours to about 7 hours.

19. A negative electrode comprising the lithium titanium oxide of claim 1.

20. A lithium battery comprising:
a positive electrode comprising a positive active material;
a negative electrode comprising the lithium titanium oxide of claim 1; and
an electrolyte.

* * * * *